March 15, 1960 J. BÖHM 2,929,012
PARALLEL CONNECTED SHORT CIRCUITERS
FOR RECTIFIER DEVICES
Filed March 31, 1958
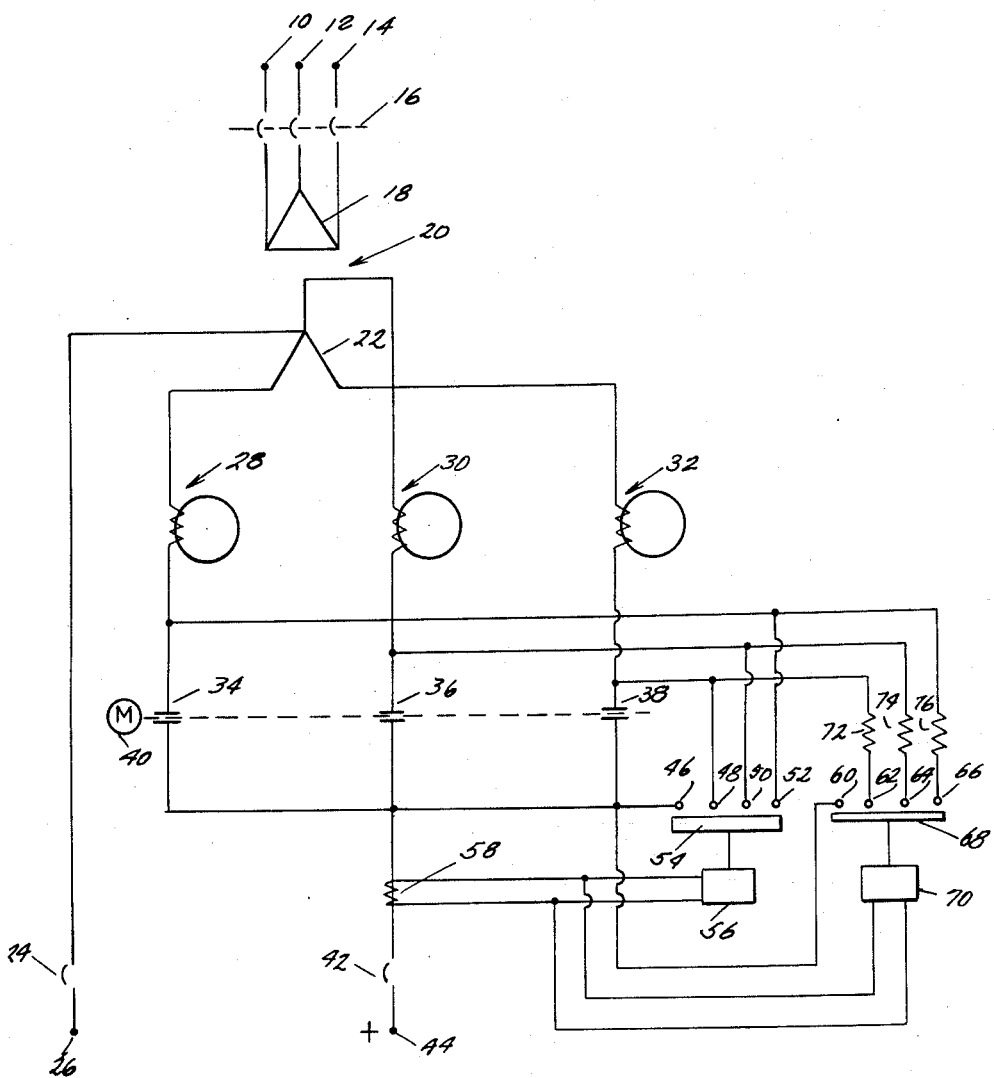
INVENTOR.
JOHANN BÖHM
BY
ATTORNEYS though other systems will readily occur to those skilled in the art.

2,929,012

PARALLEL CONNECTED SHORT CIRCUITERS FOR RECTIFIER DEVICES

Johann Böhm, Erlangen, Germany, assignor to Siemens-Schuckertwerke A.G., Berlin, Germany, a corporation of Germany Application March 31, 1958, Serial No. 725,035

7 Claims. (Cl. 321—11)

My invention relates to a novel short circuiter protective system for rectifier elements of a rectifier system, and more specifically relates to the use of a parallel connected pair of short circuiters wherein the first short circuiter has a relatively small current rating and is extremely fast, while the second short circuiter has a relatively high current rating and is slow when compared to the speed of operation of the first short circuiter.

Rectifier elements, such as semi-conductor elements or mechanical contacts, of a rectifier system are generally quite sensitive to fault current-flow therethrough so that it is necessary to remove these elements or protect them in as short a time as possible after the occurrence of a fault. The normally used A.-C. and D.-C. interrupting equipment associated with the system are usually too slow to disconnect the unit from the line in time to prevent damage or destruction to the various fault current-carrying rectifier elements. For this reason, it has become well known in the art to utilize short circuiters which operate much faster than the circuit interrupting equipment and short circuit the various rectifier elements until the A.C. and D.C. circuit interrupting equipment operates.

Short circuiters of this type are set forth in copending application Serial No. 677,631, now Patent No. 2,888,538, filed August 12, 1957, in the name of Otto Jensen, and entitled "Explosive Type Short Circuiter."

While these short circuiters operate considerably faster than the circuit interrupting equipment, there is a certain inherent time delay because the mass of the movable short circuiter elements is large, since it must carry the short circuit current of the system for a relatively long time. Because of this time delay, even though small, a certain amount of damage may be done to the rectifier elements before they are short circuited.

The principle of my invention is to provide a pair of parallel connected short circuiters wherein the first is of a relatively small size and can carry only a relatively small fraction of the rated short circuit current of the system. The second short circuiter is of the normally used type and operates in the usual manner. However, because the first short circuiter may be of relatively small size, its operation is substantially faster than that of the normally used short circuiter so that while the short circuit current of the system begins to rise, the rectifier elements are substantially immediately protected. Once the second and normal short circuiter closes, it relieves the current duty on the first and relatively small short circuiter so that the current capacity of this first unit is low and its operation is extremely fast.

If necessary, current division between the two short circuiters may be assured by appropriately dimensioned impedances which are relatively small with respect to the impedance of the rectifier elements, but still of the proper ratio with respect to the short circuiters, so that proper current division is assured.

Accordingly, a primary object of my invention is to provide a short circuiter protective means for the rectifier elements of a rectifier system wherein the rectifier elements are short circuited substantially immediately after the occurrence of a fault current.

Another object of my invention is to provide a novel short circuiter system wherein a normal type short circuiter capable of carrying the full short circuit current of the protected system is connected in parallel with a smaller and faster short circuiter device which protects the equipment to be short circuited prior to the operation of the normally used short circuiter.

These and other objects of my invention will become apparent from the following description when taken in connection with the drawing which shows a three-phase half-wave rectifier system equipped with my novel short circuiter device.

The rectifier system of the drawing shows a three-phase half-wave rectifier system which is energized from an A.-C. source connected to terminal 10, 12 and 14 which are taken through the A.-C. circuit breaker 16 and connected to the delta connected primary winding 18 of rectifier transformer 20.

Transformer 20 has a center tapped Y-connected secondary winding 22 wherein the neutral of the transformer secondary is brought out through a D.-C. breaker 24 to negative D.-C. terminal 26. Each of the phases of winding 22 are then connected in series with commutating reactors 28, 30 and 32 respectively and cooperating contacts 34, 36 and 38 respectively. Contacts 34, 36 and 38 are then driven in synchronism with the frequency of the A.-C. source by the synchronous motor 40 to selectively connect each of the contacts 34, 36 and 38 to the positive rectifier terminal 44 through the D.-C. breaker 42.

This type of system is well known in the art where the commutating reactors 28, 30 and 32 serve to provide a protective low current interval within which contacts 34, 36 and 38 may be operated. Such a rectifier system is fully described in U.S. Patent No. 2,759,141, issued August 14, 1956, in the name of Edward J. Diebold, and entitled "Regulator for Mechanical Rectifier."

While the rectifier system described herein utilizes mechanical contacts as the rectifier elements, it is to be understood that my novel invention is applicable to any type of rectifier element, such as a semi-conductor or metallic diode, and that the use of a mechanically driven contact has been selected for illustrative purposes only.

In the event of a fault condition, it is desirable to short circuit contacts 34, 36 and 38 (or semi-conductor rectifiers, if they are utilized in place of the contacts) until the A.-C. breaker 16 and D.-C. breakers 24 and 42 have a chance to operate. As has been heretofore described, it is old in the art to utilize a single short circuiter, which is schematically seen in the drawing as including fixed contacts 46, 48, 50 and 52 where the contact 46 is connected to the D.-C. side of each of the rectifier elements 34, 36 and 38, while contacts 48, 50 and 52 are connected to the A.-C. side of rectifier elements 34, 36 and 38 respectively. It is desired to interconnect contacts 46 through 52 responsive to fault conditions so that each of the contacts will be short circuited. To this end, a movable contact element schematically shown as movable contact 54 is movable into short circuiting engagement with contacts 46, 48, 50 and 52 responsive to energization of operating means 56 which may be of any type of actuating system, and is schematically shown as a block.

Operating means 56 is energized from a fault sensing means 58 associated with the positive D.-C. conductor, and could, for example, be a transductor type system which generates a pulse responsive to the reversal of current in the positive rectifier terminal, as described in copending application Serial No. 677,631, filed August 12, 1957, in the name of Otto Jensen, and entitled "Explosive Type Short Circuiter." If desired, sensing means could be associated with the A.-C. portion of the rectifier system so that operating means 56 would be energized responsive either to a failure or fault on the D.-C. system, or on the A.-C. system.

Clearly, responsive to a fault in which there is a reversal of current in the positive output bus, the operating means 56 will be energized so as to drive movable conductor 54 into short circuiting contact engagement with each of terminals 46, 48, 50 and 52 and thus short circuit each of contacts 34, 36 and 38 so that these elements are protected until the A.-C. and D.-C. protective equipment may be operated.

Because this short circuiter including contacts 46 through 52 must carry the short circuit current of the system for at least a small fraction of time, the movable components of the system are necessarily large and have substantial inertia. Hence, there is some inherent time delay between the sensing of a fault condition and the actual short circuiting of the rectifier elements during which the rectifier elements could be damaged.

I have, therefore, provided a parallel connected auxiliary short circuiter which, as is the case with the first mentioned short circuiter, includes stationary contacts 60, 62, 64 and 66 which correspond to the D.-C. positive terminal and the three A.-C. phases respectively. A relatively small movable conductor 68 is then provided to move into contact engagement with the terminals 60 through 66 responsive to operation of operating means 70 which may be energized from the same fault sensing means 58 that energizes operating means 56.

Since the right-hand short circuiter is relatively small, it will be operated in a fraction of the time that the larger short circuiter will be operated. Therefore, short circuit protection of the contacts 34, 36 and 38 is achieved almost instantaneously and prior to the operation of the normal short circuiter.

Clearly, once the normal short circuiter including movable element 54 closes, the small short circuiter to the right is itself short circuited and protected from further current carrying functions.

If desired, current distribution between the two short circuiters may be forced by the use of impedances such as resistors 72, 74 and 76 in the right-hand short circuiter which will prevent the right-hand short circuiter from carrying an undue burden of current after the closure of the left-hand short circuiter.

Although I have described preferred embodiments of my novel invention, many variations and modifications will now be obvious to those skilled in the art, and I prefer therefore to be limited not by the specific disclosure herein but only by the appended claims.

I claim:

1. In an electrical system for transmitting energy between an A.-C. system and a D.-C. system; a rectifier element interposed between said A.-C. and said D.-C. systems and constructed to conduct current in a predetermined direction; circuit interrupting means for interrupting energy transmission between said A.-C. system and said D.-C. system responsive to the occurrence of predetermined fault conditions; a short circuiter means connected to short circuit said rectifier element prior to the operation of said A.-C. and D.-C. interrupting equipment; said short circuiter means comprising a first and second short circuiter; operating means connected to said first and second short circuiter for operating said first and second short circuiter responsive to said predetermined fault conditions; said first short circuiter being operated to short circuit said rectifier element responsive to the said predetermined fault conditions and being constructed to carry substantially the full short circuit current of the faulted system; said second short circuiter being connected in parallel with said first short circuiter and being constructed to carry a relatively small portion of said short circuit current carried by said first short circuiter.

2. In an electrical system for transmitting energy between an A.-C. system and a D.-C. system; a rectifier element interposed between said A.-C. and said D.-C. systems and constructed to conduct current in a predetermined direction; circuit interrupting means for interrupting energy transmission between said A.-C. system and said D.-C. system responsive to the occurrence of predetermined fault conditions; a short circuiter means connected to short circuit said rectifier element prior to the operation of said A.-C. and D.-C. interrupting equipment; said short circuiter means comprising a first and second short circuiter; operating means connected to said first and second short circuiter for operating said first and second short circuiter responsive to said predetermined fault conditions; said first short circuiter being operated to short circuit said rectifier element responsive to the said predetermined fault conditions and being constructed to carry substantially the full short circuit current of the faulted system; said second short circuiter being connected in parallel with said first short circuiter and being constructed to carry a relatively small portion of said short circuit current carried by said first short circuiter; said second short circuiter being substantially faster in operation than said first short circuiter.

3. In an electrical system for transmitting energy between an A.-C. system and a D.-C. system; a rectifier element interposed between said A.-C. and said D.-C. systems and constructed to conduct current in a predetermined direction; circuit interrupting means for interrupting energy transmission between said A.-C. system and said D.-C. system responsive to the occurrence of predetermined fault conditions; a short circuiter means connected to short circuit said rectifier element prior to the operation of said A.-C. and D.-C. interrupting equipment; said short circuiter means comprising a first and second short circuiter; operating means connected to said first and second short circuiter for operating said first and second short circuiter responsive to said predetermined fault conditions; said first short circuiter being operated to short circuit said rectifier element responsive to the said predetermined fault conditions and being constructed to carry substantially the full short circuit current of the faulted system; said second short circuiter being connected in parallel with said first short circuiter and being constructed to carry a relatively small portion of said short circuit current carried by said first short circuiter; each of said first and second short circuiters having movable contacting elements; the movable contacting elements of said second short circuiter having a substantially smaller inertia than the movable elements of said first short circuiter.

4. In an electrical system for transmitting energy between an A.-C. system and a D.-C. system; a rectifier element interposed between said A.-C. and said D.-C. systems and constructed to conduct current in a predetermined direction; circuit interrupting means for interrupting energy transmission between said A.-C. system and said D.-C. system responsive to the occurrence of predetermined fault conditions; a short circuiter means connected to short circuit said rectifier element prior to the operation of said A.-C. and D.-C. interrupting equipment; said short circuiter means comprising a first and second short circuiter; operating means connected to said first and second short circuiter for operating said first and second short circuiter responsive to said predetermined fault conditions; said first short circuiter being operated to short circuit said rectifier element responsive to the said predetermined fault conditions and being constructed to carry substantially the full short circuit current of the faulted system; said second short circuiter being connected in parallel with said first short circuiter and being constructed to carry a relatively small portion of said short circuit current carried by said first short circuiter; and impedance means for distributing short circuit current between said first and second short circuiters when both of said first and second short circuiters are in short circuit connection with respect to said rectifier element.

5. In an electrical system for transmitting energy between an A.-C. system and a D.-C. system; a rectifier element interposed between said A.-C. and said D.-C. systems and constructed to conduct current in a predetermined direction; circuit interrupting means for interrupting energy transmission between said A.-C. system and said D.-C. system responsive to the occurrence of predetermined fault conditions; a short circuiter means connected to short circuit said rectifier element prior to the operation of said A.-C. and D.-C. interrupting equipment; said short circuiter means comprising a first and second short circuiter; operating means connected to said first and second short circuiter for operating said first and second short circuiter responsive to said predetermined fault conditions; said first short circuiter being operated to short circuit said rectifier element responsive to the said predetermined fault conditions and being constructed to carry substantially the full short circuit current of the faulted system; said second short circuiter being connected in parallel with said first short circuiter and being constructed to carry a relatively small portion of said short circuit current carried by said first short circuiter; each of said first and second short circuiters having movable contacting elements, the movable contacting elements of said second short circuiter having a substantially smaller inertia than the movable elements of said first short circuiter; and impedance means for distributing short circuit current between said first and second short circuiters when both of said first and second short circuiters are in short circuit connection with respect to said rectifier element.

6. A short circuiting protective means for electrical apparatus; said short circuiting protective means comprising a first and second short circuiter unit; each of said first and second short circuiter units including a movable contacting element movable into engagement with contacting elements connected across said electrical apparatus being protected; each of said first and second short circuiter being operated to short circuit said electrical apparatus responsive to fault conditions associated with said electrical apparatus; said first short circuiter being constructed to carry substantially the full short circuit current of said electrical apparatus for a predetermined time; said second short circuiter being constructed to carry a relatively small portion of the current carried by said first short circuiter; said movable contacting element of said first short circuiter having a substantially larger inertia than the movable contacting element of said second short circuiter; said second short circuiter being operated to short circuit said electrical apparatus substantially faster than said first short circuiter.

7. A short circuiting protective means for electrical apparatus; said short circuiting protective means comprising a first and second short circuiter unit; each of said first and second short circuiter units including a movable contacting element movable into engagement with contacting elements connected across said electrical apparatus being protected; each of said first and second short circuiter being operated to short circuit said electrical apparatus responsive to fault conditions associated with said electrical apparatus; said first short circuiter being constructed to carry substantially the full short circuit current of said electrical apparatus for a predetermined time; said movable contacting element of said first short circuiter having a substantially larger inertia than the movable contacting element of said second short circuiter; said second short circuiter being operated to short circuit said electrical apparatus substantially faster than said first short circuiter.

References Cited in the file of this patent

UNITED STATES PATENTS 2,672,584  Rolf _____ Mar. 16, 1954
2,846,636  Kleinvogel _____ Aug. 5, 1958

OTHER REFERENCES

"The Contact Rectifier," Smith, Electrical Review, June 11, 1954, pages 1103 to 1108.